United States Patent
Zwarg et al.

(10) Patent No.: US 6,707,217 B1
(45) Date of Patent: Mar. 16, 2004

(54) ELECTRIC MACHINE

(75) Inventors: Günter Zwarg, Berlin (DE); Frank Beiser, Schildow (DE)

(73) Assignee: Voith Siemens Hydro Power Generation GmbH & Co. KG, Heidenheim (DE)

(*) Notice: Subject to any disclaimer, the term of this patent is extended or adjusted under 35 U.S.C. 154(b) by 0 days.

(21) Appl. No.: 10/009,149

(22) PCT Filed: Apr. 27, 2000

(86) PCT No.: PCT/DE00/01316

§ 371 (c)(1),
(2), (4) Date: Feb. 11, 2002

(87) PCT Pub. No.: WO00/69049

PCT Pub. Date: Nov. 16, 2000

(30) Foreign Application Priority Data

May 10, 1999 (DE) .......................... 199 21 375

(51) Int. Cl.[7] .......................... H02K 9/28; H02K 13/00
(52) U.S. Cl. .................................................. 310/228
(58) Field of Search .................. 310/232, 239, 310/227, 228, 85, 86, 88

(56) References Cited

U.S. PATENT DOCUMENTS

| 4,410,821 A | * 10/1983 | Kurt ........................ 310/227 |
| 4,621,211 A | 11/1986 | Spirk ........................ 310/232 |
| 6,465,926 B2 | * 10/2002 | Rehder et al. ............ 310/227 |

FOREIGN PATENT DOCUMENTS

| DE | 195 43 383 | 5/1997 |
| GB | 1005433 | 9/1965 |
| JP | 56-103951 | 8/1981 |
| JP | 01/085549 | 3/1989 |
| JP | 09/247914 | 9/1997 |

OTHER PUBLICATIONS

Office Action dated Apr. 17, 2000 in German Patent Application No. 199 21 375.5.

* cited by examiner

Primary Examiner—Tran Nguyen
(74) Attorney, Agent, or Firm—Baker & Daniels

(57) ABSTRACT

During the operation of an electrical machine, brush dust is generated as a result of a frictional wear of the brushes (5, 50), The brush dust is deposited in undesired locations of the electric machine and causes sparkovers or increased frictional resistance. In order to solve the above-mentioned problem, the invention provides for a brush dust collecting device (41) comprising a dust collecting bead (6, 13, 21, 42) mounted in direct plurality to the slip ring (1, 11, 23, 53).

15 Claims, 4 Drawing Sheets

ELECTRIC MACHINE

BACKGROUND OF THE INVENTION

The invention relates to an electric machine with a slip ring and a brush holder.

An electric machine is a rotating machine which either as generator transforms mechanical energy into electric energy, or conversely, as an electric motor transforms electric energy into mechanical energy. The electric machine comprises a rotating rotor and a resting stator. The electric contact between rotor and stator is established through brushes. Such a brush is a component of the stator. As a springily guide slip contact it brings about the current transition to a moved machine part of the rotor, such as a collector or a slip ring. A brush is borne in a brush holder and is, as a rule, a press body of carbon, of natural-electro- or metal-graphite.

A brush is pressed, for example by a spring, onto a slip ring of the electric machine. By the movement of the slip ring the brush is slowly eroded. Hereby the press body becomes smaller by a few to several millimeters per operating hour. The material of the press body is ground into dust. The abrasion or brush dust is carried away from the brush by the air present in the electric machine, and it is distributed into the nearer and further environment of the brush. Here the brush dust settles as an electrically conductive layer on insulating parts of the electric machine and it can cause electric sparkovers there. The brush dust settles also on movable parts and bearings and causes there an increased frictional resistance.

The problem of the present invention is to give an electric machine which, even with a long-term use of several thousand hours, remains largely free from brush dust that deposits in undesired places.

SUMMARY OF THE INVENTION

This problem is solved by an electric machine with a slip ring and a brush holder, which according to the invention comprises a brush dust collecting device with a dust collecting head which is arranged in the immediate proximity of the slip ring.

The dust collecting head is formed in such manner that during the operation of the electric machine, brush dust arising on the brush holder is led into the dust collecting head. This is the case with a dust collecting head which is constructed as a vessel and that picks up dust dropping down from the brush holder. The dust collecting head can also be constructed in such manner that it collects dust that begins to be distributed from the brush holder into the environment. This happens as the dust collecting head is arranged where the dust from the brush holder is carried by air movement. The dust collecting head is constructed in such manner that it collects the dust or that the air carrying the dust can flow through the dust collecting head and the dust is conducted to a further component of the brush dust collecting arrangement.

The brush dust arises when the slip ring rubs on a brush of the electric machine. The slip ring transports the dust away from the brush holder. The dust, therefore, shortly after its arising is located directly on the slip ring. So that the dust can be collected before it can remove itself substantially from the slip ring into the electric machine, the dust collecting head is located in the immediate vicinity of the slip ring. "immediate" means here that no other component of the electric machine is located between slip ring and dust collecting head.

By the invention it is achieved that a large part of the brush dust is collected into the dust collecting head directly after its arising, or if it is conducted through the dust collecting head, it collects into a further part of the brush dust collecting arrangement. The dust, therefore, no longer settles in undesired places of the electric machine. Short circuits caused by brush dust deposits or frictional losses in the movable parts of the electric machine are accordingly largely avoided. Since the electric machine, therefore, even with a long-time use of several thousand hours, remains substantially free from brush dust deposits in undesired places, the time intervals for necessary maintenance and cleaning operations can be increase. This leads to a good utilization of the machine and to low maintenance costs for the operator.

In a preferred development of the invention the dust collecting head comprises an inlet opening which, as viewed in rotating direction of the slip ring, is located immediately behind the brush holder. As described above, the slip ring transports the brush dust in rotation direction, away from the brushes. Behind the brush holder a part of the brush dust is released from the slip ring and is transported by the current of the air carried along by the slip ring in tangential direction to the slip ring. In a preferred form of execution of the invention, the inlet opening of the dust collecting head is located in tangential direction to the dust collecting head. In this manner the major part of the brush dust is caught up by the dust collecting head very rapidly after its arising; accordingly, it no longer passes to undesired places of the electric machine.

Expediently, a dust collecting head is allocated to each brush holder of the electric machine. Accordingly, the major part of the brush dust from all the brushes is collected. The allocation can be such that to each individual brush holder a single dust collecting head is allocated, therefore each dust collecting head collects the brush dust of the brushes from only one brush holder. It is also possible, however, so assign a brush collecting head to a group of brush holders, that collects the brush dust of all the brushes of the group.

A further advantage can be achieved by the means that the brush collecting head comprises a means that guides the brush dust from the inlet opening. Such a means can be, for example, a guide plate that guides the flow of air carried along from the slip ring into the dust collecting head. Such a means, however, can also be an opening of the dust collecting head, which opening is formed in such manner that the opening encloses one or more brush holders. This form of execution of the invention largely prevents the escape of the dust into zones of the electric machine in which the dust is undesired.

In a further advantageous development of the invention the dust collecting head and the brush holder, or the dust collecting head and a group of brush holders, form a compact component. Thus brush holders and brushes, for example, are tightly enclosed by the dust collecting head. The brush dust occurring is collected with utilization of the conveyance of the air from the slip ring. Alternatively, the brush holder or the brush holder group, for example, can be integrated into the dust collecting head. In such a dust collecting head that dust collecting head encompasses the brush holder or the brush holder group either completely or largely completely. In this form of execution of the invention the brush dust that leaves the brushes is essentially located in the dust collecting head already, and it can be transported off.

An integration of brush holder and dust collecting head in a compact component is also achieved if the dust collecting head is integrated into the brush holder or into a group of brush holders. This is the case, for example, when the dust collecting head essentially consists only of an opening in a brush holder, or of an interspace between brush holders, which is arranged so as to take up the arising dust, and which is provided with means that lead the brush dust into the opening. Hereby no separate dust collecting head is necessary—which proves advantageous especially in the case of smaller electric machines, since in them there is frequently not enough room in the immediate vicinity of the brush holder for a separate dust collecting head.

In a further development of the invention the distance between the slip ring and—as seen in rotation direction of the slip ring—the front edge of the dust collecting head is greater that the distance between the slip ring and the rear edge of the dust collecting head In this manner the air carried along by the slip ring is pressed onto the front edge of the dust collecting head, into the free space between the slip ring and the dust collecting head Because of the slight distance between the slip ring and the rear edge of the dust collecting head the air, however, can poorly escape from the free space, so that between the slip ring and the dust collecting head a slight excess pressure is formed. By arranging the opening of the dust collecting head in the zone of this free space, the air carrying the brush dust with it is pressed into the dust collecting head by the rotary movement of the slip ring into the dust collecting head. The brush dust is thus transported into the dust collecting head.

Expediently the dust collecting head is made of a non-conducting material, for example a plastic material. With this form of execution of the invention the dust collecting head can be brought very close to the slip ring without there being present the risk of an electrical sparkover.

A farther advantage can be achieved by the means that the brush dust collecting device comprises a receiving container for the brush dust, and that the dust collecting head has an outlet opening which is connected with the collecting container by a pipe- or tube-system. In this manner the brush dust is led through the dust collecting head; it does not have to be stored in the dust collecting head. Furthermore, no device is needed inside the dust collecting head that serves for the separating of the brush dust from the air. The air carrying the brush dust is simply led through the dust collecting head into the collecting container in which the dust is separated and stored. The collecting container can lie inside or outside of the electric machine.

Expediently the brush collecting device comprises a suction fan The suction fan is intended to generate a subpressure in the dust collecting head. By the sub-pressure the dust-carrying air is drawn out of the environment of the brush holder into the dust collecting head. The dust collecting head thus functions as a brush dust suction nozzle, and like a dust suction nozzle, draws in the air present in the environment of the nozzle. The brush dust collecting device there is designed for example so that air can be drawn in through the entry opening of the dust collecting head and is conductable through the collecting container. In the collecting container the brush dust is separated from the air. Through this form of execution of the invention virtually all of the brush dust is transported from the brush holders into the brush dust collecting device, so that virtually no brush dust passes to undesired places of the electric machine.

Advantageously, the brush dust collecting device comprises a filter that is suited to retain brush dust in the collecting container.

The invention is especially well suited for an electric machine in which the rotor, and therewith also the slip ring, in operation, rotates about a vertical axis of rotation. Such a machine is used, for example, as generator in a hydrodynamic power plant In such a machine, as a rule because of the large number of brushes, a very large amount of brush dust arises. Furthermore, underneath the slip rings there are located further components of the electric machine and also further components of the hydrodynamic power plant which are especially sensitive to dust deposits. In such machines, therefore, it is especially advantageous to largely suppress the spreading of brush dust.

DESCRIPTION OF THE DRAWINGS

Examples of execution of the invention are explained in detail with the aid of four figures. In the drawings.

DETAILED DESCRIPTION

Figure 1:
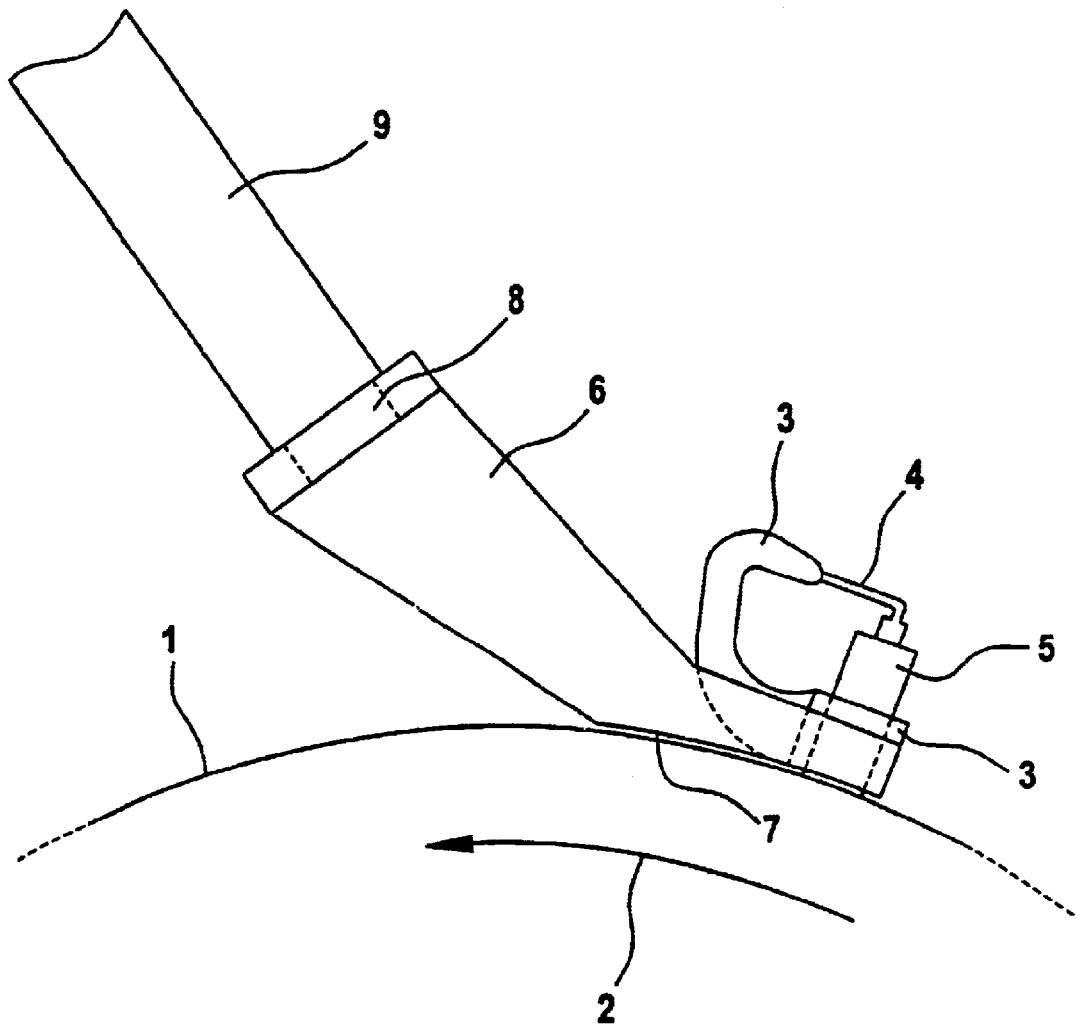
FIG. 1 shows a side view of a dust collecting head and a brush holder.

In FIG. 1 a slip ring 1 of an electric machine is represented which (slip ring), in operation of the electric machine, rotates in rotating direction 2. Tightly on the slip ring there is arranged a brush holder 3 fastened to the stator, the steel spring 4 of which brush holder presses a brush 5 consisting of pressed charcoal onto the slip ring. In immediate proximity to the slip ring 1 there is arranged a brush dust collecting device. The inlet opening 7 of the dust collecting head which is directed toward the slip ring 1 is shown in FIG. 1 not visible as an opening but only as a line *I The dust collecting head 6 has an outlet opening 8 through which air can flow from the interior of the dust collecting head 6 into a tube 9 of the brush dust collecting device. The air of the brush dust collecting device is drawn by a suction fan (not shown in FIG. 1), from the dust collecting head 6 into the tube 9.

During the operation of the electric machine brush dust is rubbed from the brush 5 by the slip ring 1. This brush dust is carried by air that is carried along by slip ring 1 in rotation direction 2, to the entry opening 7 of the dust collecting head 6. By the sub-pressure generated by the suction fan in the dust collecting head 6 of the brush dust collecting device, the dust carrying air is prevented from leaving the dust collecting head 6. It is drawn through the entry opening 7 into the dust collecting head 6 and onward into the tube 9.

The brush dust is therefore drawn off directly at the point of its arising, by means of the dust collecting head 6 that functions as a suction nozzle. Since the dust collecting head 6 is arranged in tangential direction to the slip ring, the brush dust is transported in the direction of the inlet opening. It cannot escape either from the zone around the inlet opening 7 into the space around the slip ring 1 since it is drawn into the dust collecting head 6. In this manner nearly all of the dust generated in the brush holder 3 is taken up by the brush dust collecting device and transported to a place provided for it within the brush dust collecting device.

Figure 2:
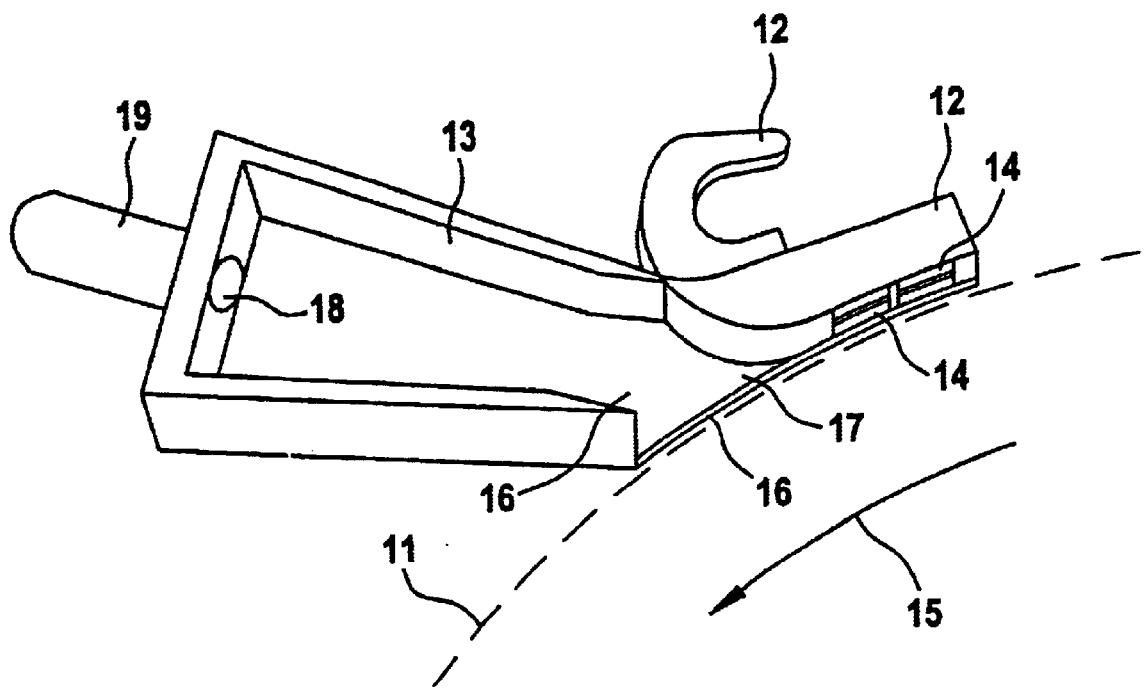
FIG. 2 a perspective view of a dust collecting head and a brush holder.

FIG. 2 shows in perspective representation a combination of brush holder 12 and dust collecting head 13, arranged on a slip ring 11. The slip ring 11 itself is not represented. Its position is indicated merely by a broken line. The brushes not represented in FIG. 2 lie in shafts 14 of the brush holder 12 during operation of the electric machine. In the neighborhood of the brush holder 12 and in immediate proximity to the slip ring 11, there is arranged a dust collecting head 13 of a brush dust collecting device. The dust collecting head 13 is represented without cover, so that the interior of the duct collecting head 13 is visible. During operation of the electric machine, the cover closes the interior of the dust collecting head 13. The front edge of the cover comes to lie there on the front edge of the brush holder 12. The front and the rear of the brush holder 12, there, are determined by the rotation direction 15 of the slip ring 11. The rear wall 16 of the dust collecting head 13 lying opposite the cover is arranged symmetrically to the cover. Together with the cover it forms a means that guides the brush dust to the inlet opening 17.

During operation of the electric machine the brush dust, generated in the brush holder 12 is carried by the air carried along by the slip ring 11 rotating about a vertical axis of rotation to the inlet opening 17 of the dust collecting head 13. It (the air) is drawn from there—by a fan not represented in FIG. 2) of the brush dust collecting device—into the dust collecting head 13 and onward through an outlet opening 18 into a tube 19 of the brush dust collecting device. The dust collecting head 13 is constructed in such manner that—even with dropout of the draw-off fan—the cooling of the brush holder 12 and of the slip ring 11 is virtually unimpaired.

Figure 3:
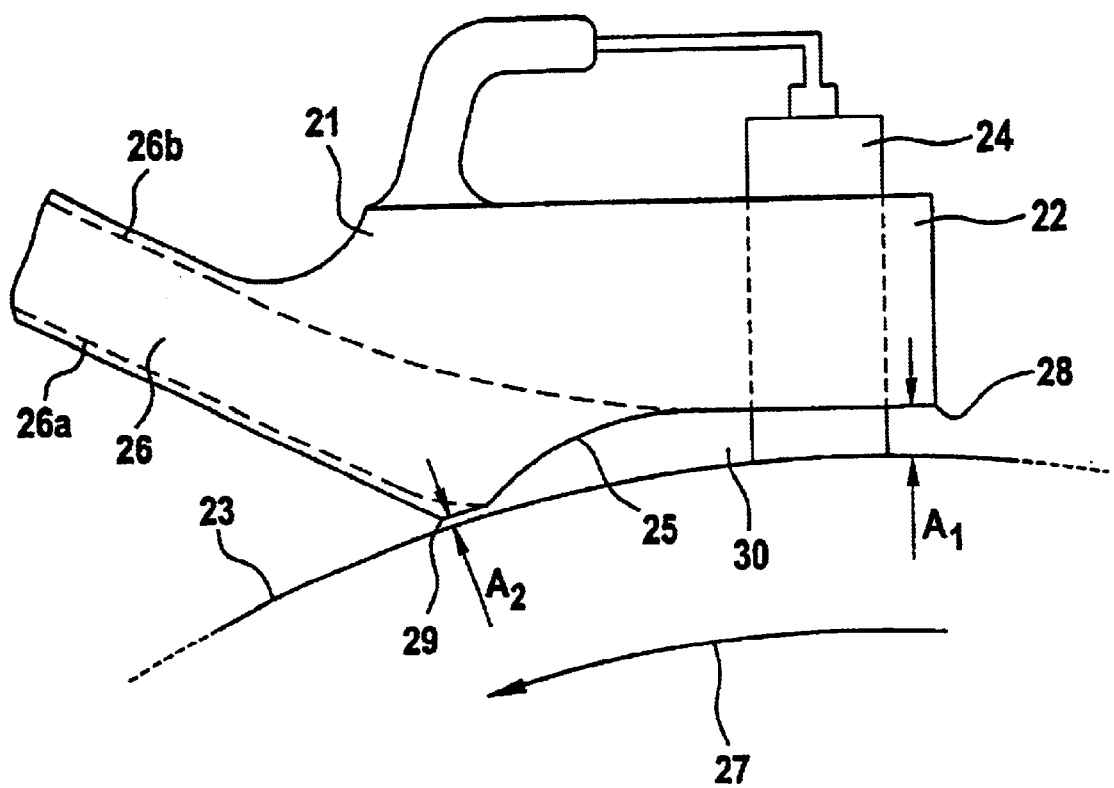
FIG. 3 a dust collecting head and a brush holder as a compact component.

The dust collecting head 21 of the brush dust collecting device of an electric machine represented in FIG. 3 forms a compact component with a brush holder 22. The dust collecting head 21 is integrated into the brush holder 22. The abrasion of the brush 24 generated by the rubbing of the slip ring 23 is carried as brush dust to the inlet opening 25 of the dust collecting head 21. The dust is transported from there through a tubular interior space 26 of the dust collecting head 21 to a further component of the brush dust collecting device. The interior space 26 of the dust collecting head 21 is represented by broken lines 26a and 26b.

The distance $A_1$ between slip ring 23 and the front edge 28 as seen in rotation direction 27 of the slip ring 23) of the dust collecting head 21 is greater than the distance $A_2$ between slip ring 23 and the rear edge 29 of the dust collecting head. The front edge 28 of the dust collecting head 21 is simultaneously also the front edge 28 of the brush holder 22. Through the relatively great distance $A_1$ between slip ring 23 and dust collecting head 21, during the operation of the electric machine, much air that is carried along by the slip ring can pass into the space 30 between dust collecting head 21 and slip ring 23. Only a small part of this air can leave the space 30 through the narrow gap between the rear edge 29 of the dust collecting head 21 and slip ring 23. The for larger part of the air presses through its own movement into the inlet opening 25 of the dust collecting head 21 and therewith brings about a transport of the brush dust through the interior space 26 of the dust collecting head 21 to a further component of the brush dust collecting device.

In this example of execution of the invention nearly all brush dust generated in the brush holder 22 is collected by the dust collecting head 21 and therefore no longer passes to undesired places within the electric machine.

Figure 4:
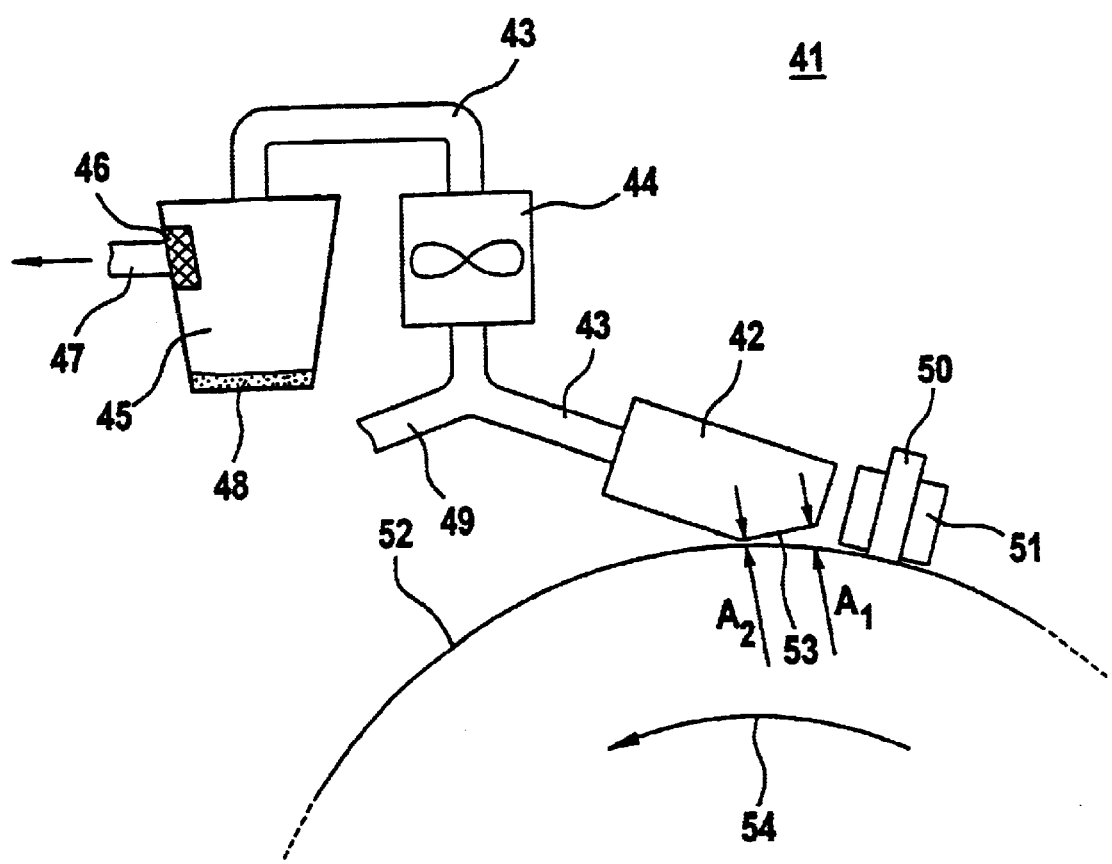
FIG. 4 a schematic representation of a brush collecting installation.

FIG. 4 shows in schematic representation a brush dust collecting device 41. It comprises a dust collecting head 42, a tube system 43 which connects the dust collecting head 42 with a fan 44 and further with a collecting container 45. In the collecting container 45 there is arranged a filter 46, which filters brush dust out of the air passing through the filter 46. The brush dust 48 is gathered in the collecting container 45. Upon the collecting container 45 there follows a tube system 47 which leads the air out of the brush dust collecting device 41. In the tube system 43 there is arranged a branch-off which is connected by a tube 49 with a further dust collecting head of the brush dust collecting device 41. To each brush holder of the electric machine there is allocated a dust collecting head of the brush dust collecting device 41.

The brush dust abraded from the brush 50 of the brush holder 51 by the slip ring 52 is drawn by the fan.44 into the inlet opening 53 of the dust collecting head 42. For the reinforcement of the air flow into the dust collecting head 42 the dust collecting head 42 is formed in such manner that the distance A, between slip ring 52 and the front edge of the dust collecting head 42 is greater than the distance $A_2$ between slip ring 52 and the rear edge of the dust collecting head 42. The front and the rear are defined by the rotation direction 54 of the slip ring 52.

What is claimed is:

1. Electric machine comprising:

a slip ring;

a brush holder; and a brush dust collecting device including a dust collecting head arranged in immediate proximity to the slip ring, said dust collecting head having an inlet opening arranged immediately behind the brush holder with respect to a direction of rotation of the slip ring;

said dust collecting head including means for guiding dust to the inlet opening.

2. Electric machine according to claim 1 characterized in that the dust collecting head and the brush holder form a compact component.

3. Electric machine according to claim 1 wherein a distance between the slip ring and the front edge of the dust collecting head is greater than a distance between the slip ring and a rear edge of the dust collecting head, wherein the front edge and the rear edge of the dust collecting head are respectively located with respect to a direction of rotation of the slip ring.

4. Electric machine according to claim 1 characterized in that the brush dust collecting device comprises a collecting container for brush dust and that the dust collecting head has an outlet opening which is connected through a pipe or tube system with the collecting container.

5. Electric machine according to claim 4 characterized in that the brush dust collecting device comprises a suction fan.

6. Electric machine according to claim 4, characterized in that the brush dust collecting device comprises a filter which is suited to retain brush dust in the collecting container.

7. Electric machine according to claim 1, characterized in that the slip ring rotates in a direction about a vertical axis of rotation.

8. Electric machine comprising:

a slip ring;

a brush holder; and a brush dust collecting device including a dust collecting head arranged in immediate proximity to the slip ring, said dust collecting head having an inlet opening arranged immediately behind the dust holder with respect to a direction of rotation of the slip ring;

the dust collecting head and the brush holder forming a compact component.

9. Electric machine comprising:

a slip ring;

a brush holder; and a brush dust collecting device including a dust collecting head arranged in immediate proximity to the slip ring;

said dust collecting head including means for guiding dust to the inlet opening;

the dust collecting head and the brush holder forming a compact component.

10. Electric machine comprising:

a slip ring;

a brush holder; and a brush dust collecting device including a dust collecting head arranged in immediate proximity to the slip ring;

said dust collecting head including means for guiding dust to the inlet opening;

a distance between the slip ring and a front edge of the dust collecting head being greater than a distance between the slip ring and a rear edge of the dust collecting head, wherein the front edge and the rear edge of the dust collecting head are respectively located with respect to a direction of rotation of the slip ring.

11. Electric machine comprising:

a slip ring;

a brush holder; and a brush dust collecting device including a dust collecting head arranged in immediate proximity to the slip ring;

the dust collecting head and the brush holder forming a compact component;

a distance between the slip ring and a front edge of the dust collecting head being greater than a distance between the slip ring and a rear edge of the dust collecting head, wherein the front edge and the rear edge of the dust collecting head are respectively located with respect to a direction of rotation of the slip ring.

12. Electric machine comprising:

a slip ring;

a brush holder; and a brush dust collecting device including a dust collecting head arranged in immediate proximity to the slip ring, the dust collecting head including means for guiding dust to the inlet opening;

the brush dust collecting device comprising a collecting container for brush dust and the dust collecting head having an outlet opening which is connected through a pipe or tube system with the collecting container.

13. Electric machine comprising:

a slip ring;

a brush holder; and a brush dust collecting device including a dust collecting head arranged in immediate proximity to the slip ring;

the dust collecting head and the brush holder forming a compact component;

the brush dust collecting device comprising a collecting container for brush dust and the dust collecting head having an outlet opening which is connected through a pipe or tube system with the collecting container.

14. Electric machine comprising:

a slip ring;

a brush holder; and a brush dust collecting device including a dust collecting head arranged in immediate proximity to the slip ring;

a distance between the slip ring and a front edge of the dust collecting head being greater than a distance between the slip ring and rear edge of the dust collecting head, wherein the front edge and the rear edge of the dust collecting head are respectively located with respect to a direction of rotation of the slip ring;

the brush dust collection device comprising a collecting container for brush dust and the dust collecting head having an outlet opening which is connected through a pipe or tube system with the collecting container.

15. Electric machine comprising:

a slip ring;

a brush holder; and a brush dust collecting device including a dust collecting head arranged in immediate proximity to the slip ring, said dust collecting head having an inlet opening arranged immediately behind the brush holder with respect to a direction of rotation of the slip ring;

said dust collecting head including a dust guide located in proximity to the inlet opening.

* * * * *